US009061602B2

(12) United States Patent
Stoewe et al.

(10) Patent No.: US 9,061,602 B2
(45) Date of Patent: Jun. 23, 2015

(54) AIR CONDITIONING DEVICE FOR A VEHICLE INTERIOR COMPONENT

(75) Inventors: Stefan Stoewe, Mering (DE); Angelika Riedi, München (DE); Jens Harnisch, Mering (DE)

(73) Assignee: Gentherm GmbH, Odelzhausen (DE)

( * ) Notice: Subject to any disclaimer, the term of this patent is extended or adjusted under 35 U.S.C. 154(b) by 2165 days.

(21) Appl. No.: 11/787,342

(22) Filed: Apr. 16, 2007

(65) Prior Publication Data

US 2007/0245760 A1 Oct. 25, 2007

(30) Foreign Application Priority Data

Apr. 20, 2006 (DE) .......................... 10 2006 018 785
Jul. 7, 2006 (DE) .......................... 10 2006 031 899

(51) Int. Cl.
| | | |
|---|---|---|
| *B60H 1/00* | (2006.01) | |
| *B60N 2/00* | (2006.01) | |
| *B60N 2/56* | (2006.01) | |

(52) U.S. Cl.
CPC .............. *B60N 2/002* (2013.01); *B60N 2/5635* (2013.01); *B60N 2/5642* (2013.01); *B60N 2/5657* (2013.01); *B60N 2/5685* (2013.01)

(58) Field of Classification Search
CPC .. B60H 1/00; B60H 2001/003; B60H 1/2225; B60N 2/002; B60N 2/56; B60N 2/565; B60N 2/58; B60N 2/5621; B60N 2/00; B60N 2/5678; B60N 2/5685; B60N 2/5692; A47C 7/72; A47C 7/748; A47C 7/74; A47C 7/742; A47C 7/744; A47C 7/746; A47C 21/04; A47C 21/048

USPC ................... 165/202, 203, 204; 219/217, 219; 297/180.12, 284.1
See application file for complete search history.

(56) References Cited

U.S. PATENT DOCUMENTS

| | | | | |
|---|---|---|---|---|
| 2,596,547 | A | * | 5/1952 | Guest ................................ 5/502 |
| 3,136,577 | A | * | 6/1964 | Richard ........................ 219/202 |
| 3,137,523 | A | * | 6/1964 | Karner ...................... 297/180.13 |
| 3,951,127 | A | * | 4/1976 | Watson et al. .................... 5/284 |
| 4,060,276 | A | * | 11/1977 | Lindsay .................... 297/180.11 |
| 4,423,308 | A | * | 12/1983 | Callaway et al. ............. 219/217 |
| 4,440,443 | A | * | 4/1984 | Nordskog .................... 297/397 |
| 4,549,323 | A | * | 10/1985 | Brockhaus ........................ 5/500 |
| 4,590,359 | A | * | 5/1986 | Mobius ........................ 219/217 |

(Continued)

FOREIGN PATENT DOCUMENTS

| | | |
|---|---|---|
| DE | 4338285 | 11/1993 |
| DE | 19724168 C1 | 8/1998 |

(Continued)

*Primary Examiner* — Ljiljana Ciric
(74) *Attorney, Agent, or Firm* — The Dobrusin Law Firm, P.C.

(57) ABSTRACT

An air-conditioning device for conditioning/controlling the temperature of a surface contacted by a user at least occasionally, especially the surface of a vehicle interior component, which can be monitored by means of a corresponding detector device for detecting contact, use, or both. It is provided that the air-conditioning device has at least one air-conditioning layer, which extends at least partially along the surface, at least one companion layer, which extends at least partially along the air-conditioning layer and is connected to the air-conditioning layer at least in some sections in order to form an insertion pocket, and that at least one detector device can be inserted into the insertion pocket.

8 Claims, 4 Drawing Sheets

(56) References Cited

U.S. PATENT DOCUMENTS

| | | | | |
|---|---|---|---|---|
| 4,604,987 A * | 8/1986 | Keltner | 5/421 |
| 4,633,061 A * | 12/1986 | Arikawa | 219/217 |
| 4,813,738 A * | 3/1989 | Ito | 297/180.12 |
| 4,862,438 A * | 8/1989 | Fry | 5/636 |
| 4,865,379 A * | 9/1989 | Aoki et al. | 297/180.12 |
| 4,998,311 A * | 3/1991 | Ernst | 5/654 |
| 5,002,335 A * | 3/1991 | Bengtsson | 297/180.12 |
| 5,022,108 A * | 6/1991 | Larson | 5/422 |
| 5,168,590 A * | 12/1992 | O'Sullivan | 5/490 |
| 5,176,424 A * | 1/1993 | Tobita et al. | 297/284.1 |
| 5,226,188 A * | 7/1993 | Liou | 5/653 |
| 5,468,020 A * | 11/1995 | Scime | 297/216.11 |
| 5,513,400 A * | 5/1996 | Turner | 5/422 |
| 5,630,240 A * | 5/1997 | Matsuoka et al. | 5/653 |
| 5,662,380 A * | 9/1997 | Tam et al. | 297/354.12 |
| 5,692,952 A * | 12/1997 | Chih-Hung | 297/180.11 |
| 5,715,695 A * | 2/1998 | Lord | 297/180.1 |
| 5,833,309 A * | 11/1998 | Schmitz | 297/180.11 |
| 5,915,783 A * | 6/1999 | McDowell et al. | 297/180.12 |
| 5,918,933 A * | 7/1999 | Hutchinson et al. | 297/219.12 |
| 5,924,767 A * | 7/1999 | Pietryga | 297/180.13 |
| 5,927,817 A * | 7/1999 | Ekman et al. | 297/180.14 |
| 6,003,950 A * | 12/1999 | Larsson | 297/180.13 |
| 6,018,960 A * | 2/2000 | Parienti | 62/314 |
| 6,064,037 A * | 5/2000 | Weiss et al. | 219/217 |
| 6,073,998 A * | 6/2000 | Siarkowski et al. | 297/180.12 |
| 6,093,910 A * | 7/2000 | McClintock et al. | 219/217 |
| 6,135,551 A * | 10/2000 | Linder | 297/217.4 |
| 6,150,642 A * | 11/2000 | Weiss et al. | 219/217 |
| 6,158,815 A * | 12/2000 | Sugie et al. | 297/452.49 |
| 6,164,719 A * | 12/2000 | Rauh | 297/180.12 |
| 6,189,487 B1 * | 2/2001 | Owen et al. | 219/217 |
| 6,289,538 B1 * | 9/2001 | Fidge | 5/640 |
| 6,371,552 B1 * | 4/2002 | Narita et al. | 297/180.12 |
| 6,489,595 B1 * | 12/2002 | Check et al. | 219/217 |
| 6,609,752 B2 * | 8/2003 | Inoue | 297/217.3 |
| 6,659,549 B1 * | 12/2003 | Wang et al. | 297/217.3 |
| 6,848,746 B2 * | 2/2005 | Gentry | 297/380 |
| 6,877,808 B2 * | 4/2005 | Lichtinger et al. | 297/217.3 |
| 6,893,086 B2 * | 5/2005 | Bajic et al. | 297/180.14 |
| 6,953,224 B2 * | 10/2005 | Seto et al. | 297/217.3 |
| 7,040,710 B2 * | 5/2006 | White et al. | 297/452.46 |
| 7,048,338 B2 * | 5/2006 | Pinkos | 297/452.6 |
| 7,052,091 B2 * | 5/2006 | Bajic et al. | 297/452.43 |
| 7,097,244 B2 * | 8/2006 | Holmgren et al. | 297/219.12 |
| 7,134,715 B1 * | 11/2006 | Fristedt et al. | 297/180.12 |
| 7,205,510 B2 * | 4/2007 | Howick | 219/217 |
| 7,331,635 B2 * | 2/2008 | Schwarz et al. | 297/452.18 |
| 7,338,117 B2 * | 3/2008 | Iqbal et al. | 297/180.11 |
| 7,356,912 B2 * | 4/2008 | Iqbal et al. | 165/43 |
| 7,438,356 B2 * | 10/2008 | Howman et al. | 297/180.11 |
| 7,500,536 B2 * | 3/2009 | Bulgajewski et al. | 219/202 |
| 7,637,573 B2 * | 12/2009 | Bajic et al. | 297/452.43 |
| 7,708,101 B2 * | 5/2010 | Hofmann | 297/217.2 |
| 7,725,966 B2 * | 6/2010 | Prater et al. | 5/484 |
| 7,735,932 B2 * | 6/2010 | Lazanja et al. | 297/180.12 |
| 7,860,625 B2 * | 12/2010 | Jaramillo et al. | 180/273 |
| 8,052,212 B2 * | 11/2011 | Backendorf | 297/217.3 |
| 8,162,391 B2 * | 4/2012 | Lazanja et al. | 297/180.14 |
| 8,492,680 B2 * | 7/2013 | Ohashi et al. | 219/202 |
| 8,944,145 B2 * | 2/2015 | Esaki | 165/42 |
| 8,975,561 B2 * | 3/2015 | Luppold et al. | 219/230 |
| 2001/0045104 A1 * | 11/2001 | Bailey et al. | 62/510 |
| 2003/0039298 A1 * | 2/2003 | Eriksson et al. | 374/109 |
| 2003/0189362 A1 * | 10/2003 | Lichtinger et al. | 297/217.3 |
| 2004/0036326 A1 * | 2/2004 | Bajic et al. | 297/180.14 |
| 2004/0075311 A1 * | 4/2004 | Linder | 297/188.04 |
| 2004/0155506 A1 * | 8/2004 | Gentry | 297/380 |
| 2005/0067862 A1 * | 3/2005 | Iqbal et al. | 297/180.11 |
| 2005/0103773 A1 * | 5/2005 | Diemer et al. | 219/217 |
| 2005/0127723 A1 * | 6/2005 | Bajic et al. | 297/180.11 |
| 2005/0140189 A1 * | 6/2005 | Bajic et al. | 297/180.1 |
| 2005/0178755 A1 * | 8/2005 | Ulbrich | 165/202 |
| 2006/0102262 A1 * | 5/2006 | Rodrigues | 150/158 |
| 2006/0112491 A1 * | 6/2006 | Buehner | 5/691 |
| 2006/0152044 A1 * | 7/2006 | Bajic et al. | 297/180.14 |
| 2007/0013213 A1 * | 1/2007 | Axinte et al. | 297/180.12 |
| 2007/0120399 A1 * | 5/2007 | Bajic et al. | 297/180.11 |
| 2007/0152479 A1 * | 7/2007 | Howman et al. | 297/180.11 |
| 2007/0158981 A1 * | 7/2007 | Almasi et al. | 297/180.12 |
| 2007/0252417 A1 * | 11/2007 | Neustat | 297/217.1 |
| 2008/0042478 A1 * | 2/2008 | Neustat | 297/228 |
| 2008/0211269 A1 * | 9/2008 | Iqbal et al. | 297/180.14 |
| 2012/0272450 A1 * | 11/2012 | Pittman | 5/119 |

FOREIGN PATENT DOCUMENTS

| | | |
|---|---|---|
| DE | 19805174 | 6/1999 |
| DE | 10029237 | 12/2001 |
| DE | 10057222 | 6/2002 |
| EP | 0873903 | 10/1998 |
| WO | WO 01/89267 | 11/2001 |
| WO | WO 02/06083 | 1/2002 |
| WO | WO 02/053411 | 7/2002 |
| WO | WO 2004/005068 | 1/2004 |

* cited by examiner

AIR CONDITIONING DEVICE FOR A VEHICLE INTERIOR COMPONENT

CLAIM OF BENEFIT OF EARLIER FILING DATE

The present application claims the benefit of the filing date of German Application Nos. DE 102006018785.7 (filed Apr. 20, 2006) and DE 102006031899.4 (filed Jul. 7, 2006) the contents of which are hereby incorporated by reference in their entirety.

Technical Field

The present invention relates to devices for air conditioning, detecting, and seating, and particularly to vehicle seats that are air conditioned.

BACKGROUND OF THE INVENTION

Detector devices are used in seats in order to identify users on the seats (WO 2004/005068). It is also known to provide seats or the like with heaters in order to keep the user warm (DE 19724168 C1, WO 02/06083 A1). However, because the two functional systems have to be arranged as close as possible to the contact surface to work reliably and efficiently, under some circumstances they produce mutual interference.

For example, the temperature at the heating element must not become too high, because otherwise the measurement by the detector device would become incorrect. Therefore, more homogeneously heating and thus more expensive material must be used for the heating resistors. Simultaneously, heating elements would be thermally insulated by a detector device arranged simultaneously above these elements, and higher thermal output would actually be required. In addition, two simple systems, e.g., fixed to each other through adhesion, would cause the seat cushion to seem harder, and would require complicated positioning relative to each other.

Systems are known (DE 4338285, EP 0873903) in which an electric surface-heating element is used simultaneously as a sensor for the contact/use of a heated surface. This design, however, is difficult to realize from a metrological standpoint.

Heating elements (DE 10029237) are also known, which become electrically conductive in the area of loading when pressure is applied, and which locally heat this area. However, they supply no measurement signals to external devices.

There are other systems that arrange components of a heating element and a detector on a common carrier (WO 01/89267, DE 10057222). Such composite systems, however, are barely air permeable and require additional measures to shield the detector device from the heat conductors. In addition, defective parts are relatively expensive.

In addition, mat-like air-conditioning devices are known, e.g., from WO 02/053411 A2. A mat-like air-conditioning device has the advantage that it can be integrated easily into the production of the seat, in that it is placed on the completed seat cushion. Placement of the air-conditioning layer is thus independent of production of the actual cushion. In addition, the shape of the cushion is also nearly arbitrary, so that a single embodiment of a mat-like air-conditioning device can be used universally for many different seats. However, here there is the same problem in the simultaneous use of an air-conditioning layer and a seat occupancy detection device.

A vehicle seat is known from DE 19805174 that has air permeable cushioning. Heating elements are arranged in this cushioning. A fan blows air into the cushioning, circulates the air around the heating elements, and blows the heated air to the seat surface. The integration of such heating elements into the seat cushioning is complicated, however, and leads to the loss of comfort due to hardened sections in the cushion.

Thus, one problem is controlling/conditioning the temperature of surfaces in contact with users and simultaneously monitoring the use reliably; and here keeping the production costs moderate.

SUMMARY OF THE INVENTION

The teachings herein provide an air-conditioning device for a vehicle interior component. The air-conditioning device includes at least one air-conditioning layer, at least one companion layer, and at least one detector device. The at least one companion layer includes one or two edges affixed to at least one edge of the at least one air-conditioning layer and forming an insertion pocket therebetween. The insertion pocket defines an insertion opening. The at least one detector device is inserted into the insertion pocket through the insertion opening.

BRIEF DESCRIPTION OF THE DRAWINGS

Details of the invention are explained below. These designs should make the invention understandable. However, they serve only as examples. Obviously, within the scope of the invention, single or multiple described features can also be left out, modified, or expanded. The features of different embodiments can obviously also be combined with each other. Below, reference is made to.

DETAILED DESCRIPTION OF THE INVENTION

"Close to the surface" is understood to be the area of a component, especially a seat cushion, lying between a surface contacted by a user and the center of the cushion/component. Here, "center" is based on the normal at the corresponding point on the surface, at least for flat surfaces.

"Air conditioning" is here understood to be, in particular, controlling the temperature, cooling, heating, dehumidification, and/or ventilation.

"Layer" is understood to be any structure, especially a surface structure, which extends predominantly in two dimensions and which is preferably, but not necessarily, flat and flexible. It preferably forms a contiguous surface but can also be discontinuous, e.g., a spacing fabric, mesh, tubing system, or foam.

Materials that are here considered "thermally insulated" are in particular those that have a specific thermal conductivity that is lower than that of water. In addition, these materials are understood to include those that exhibit a temperature difference of at least 10° C. on their two sides for a material thickness of one millimeter when one surface of a disk of the material borders a dark space at standard laboratory conditions (21° C., . . . ), and the opposite surface is heated.

Figure 1:
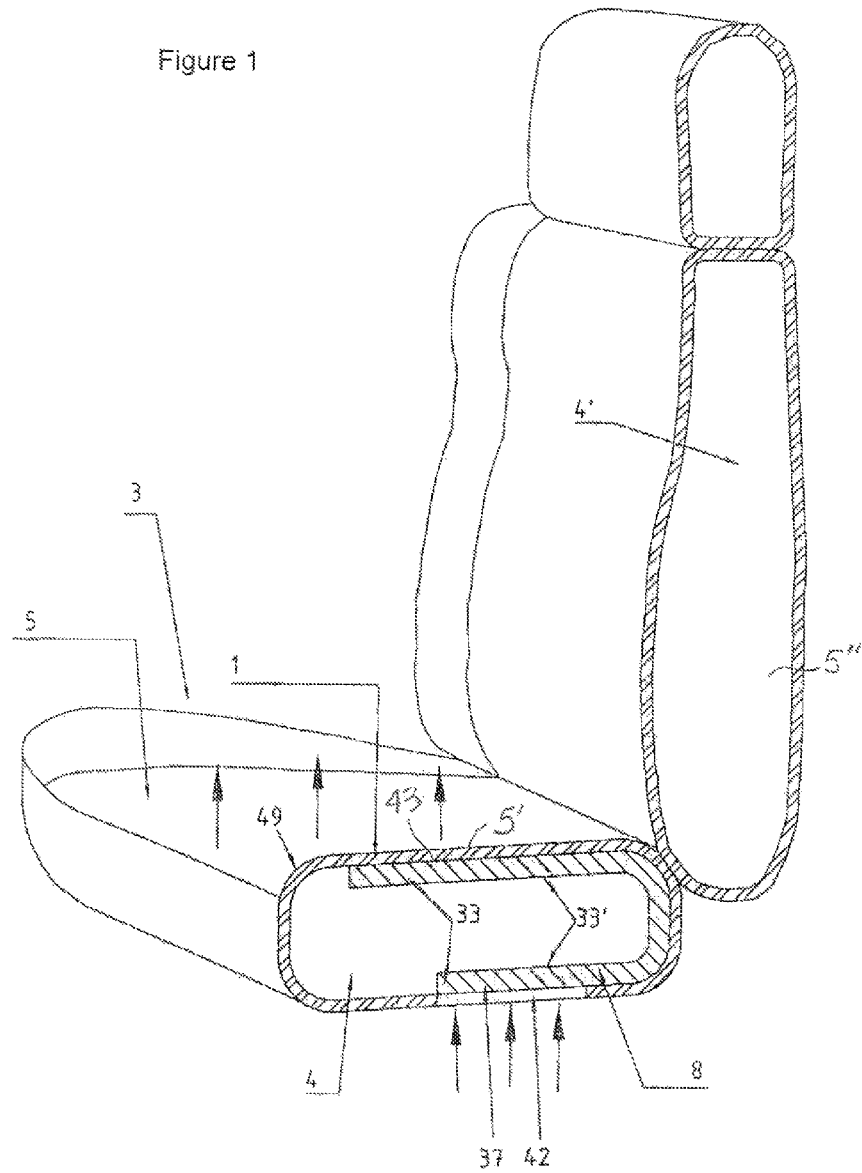
FIG. 1, an oblique view of a seat in longitudinal section.
Figure 2:
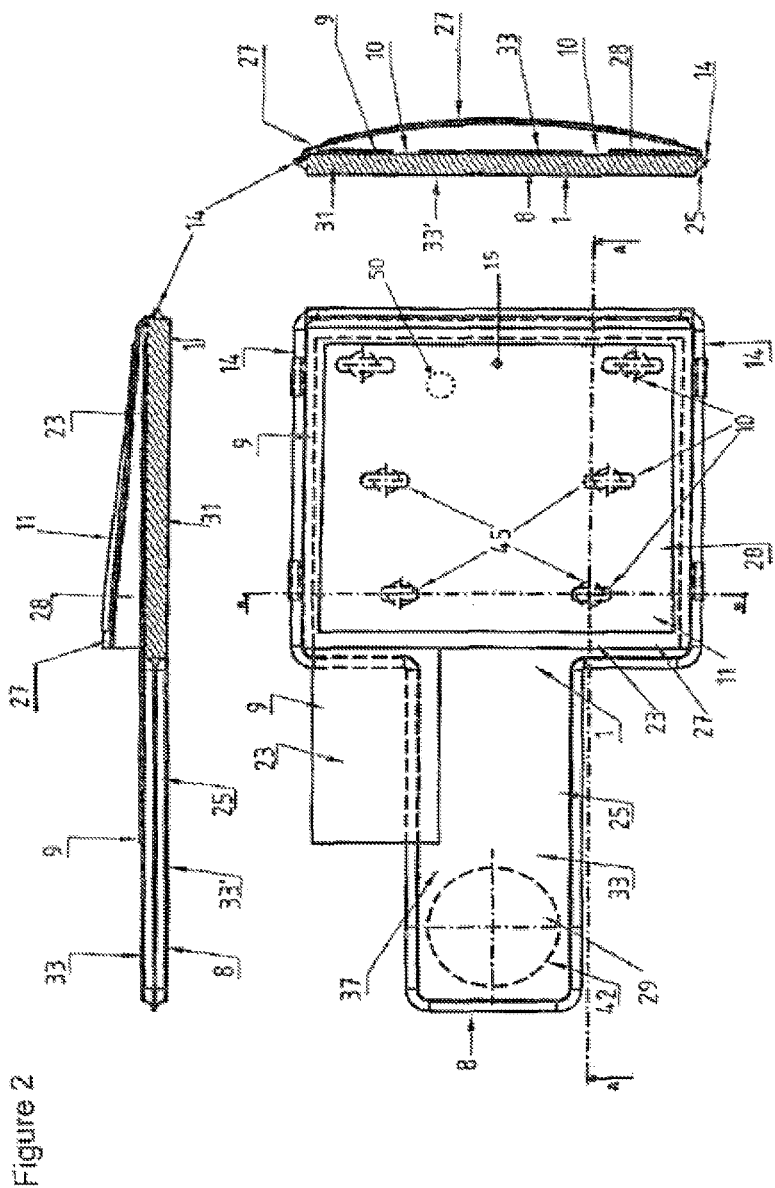
FIG. 2, an embodiment of an air-conditioning device in a) top view; b) longitudinal section; and c) cross section.
Figure 3:
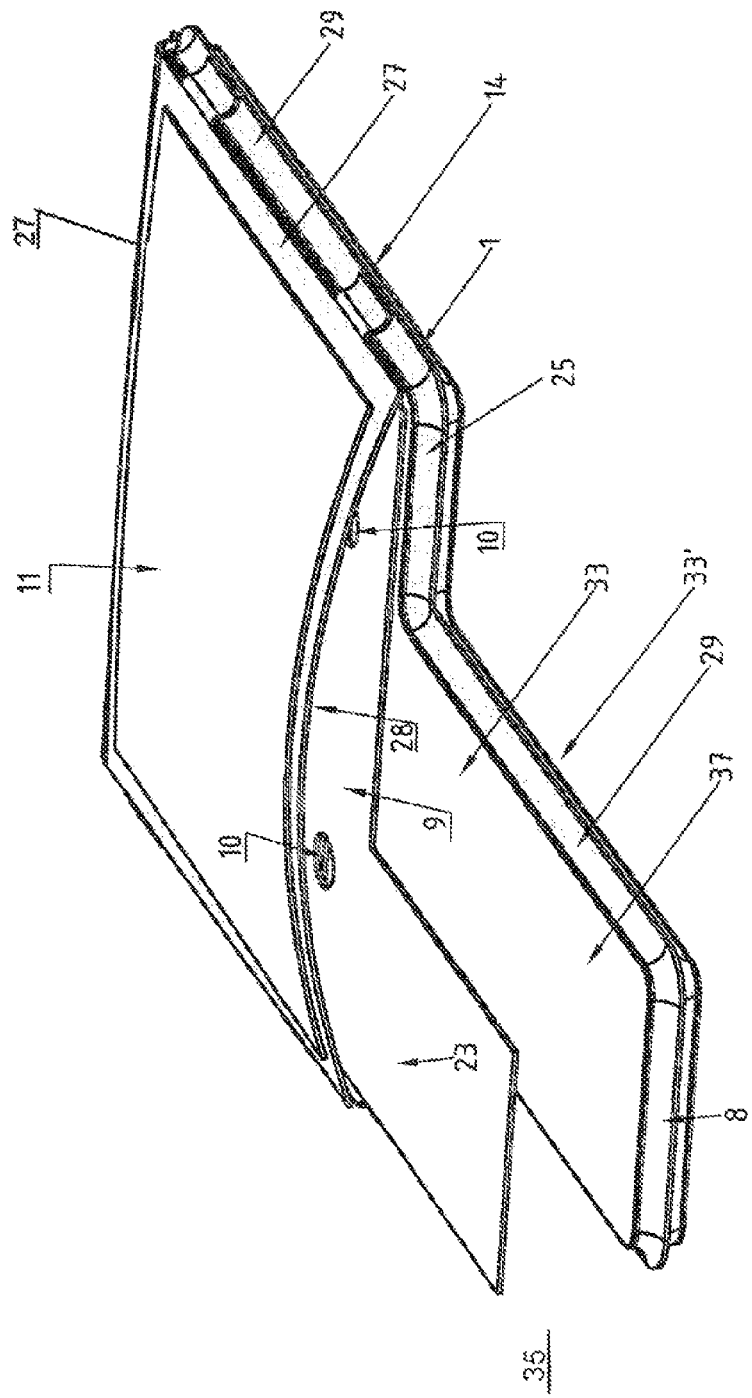
FIG. 3, an oblique view of the embodiment of FIG. 2.
Figure 4:
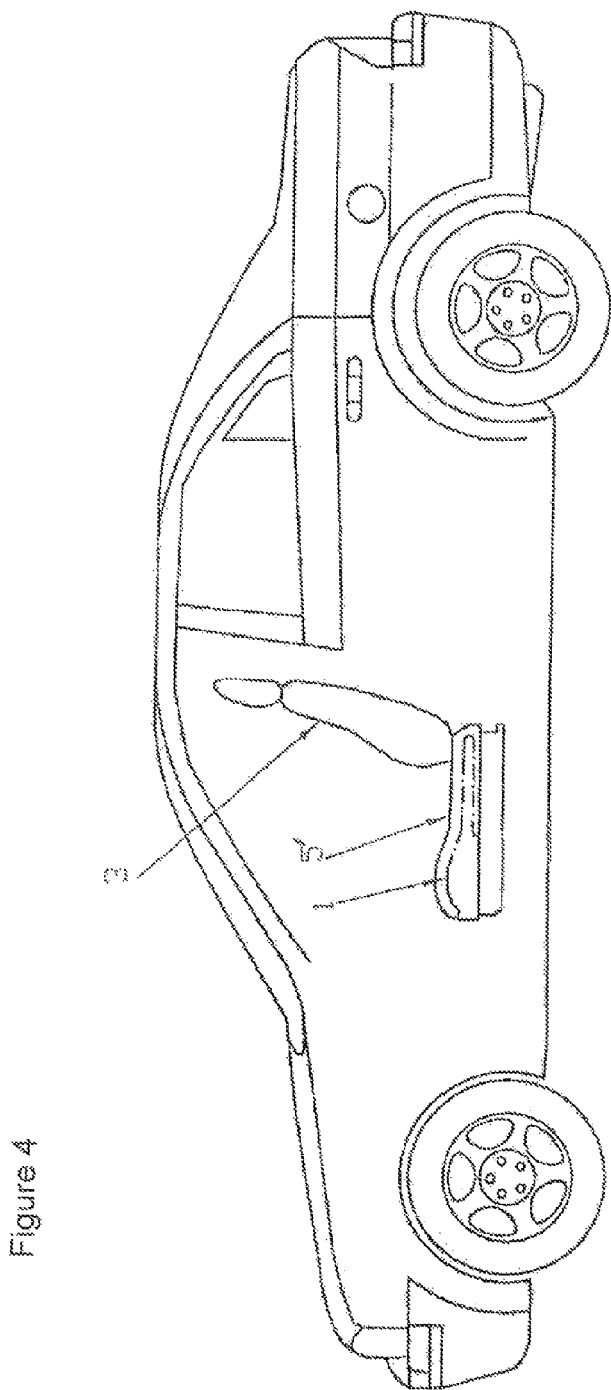
FIG. 4, an oblique view of a vehicle with an air-conditioning/detection device according to the invention.

FIG. 1 shows a seat 3 with a seat cushion 4 and a backrest cushion 4'. The seat cushion 4 is equipped with an air-conditioning device 1.

The air-conditioning device 1 has an air-guiding device 8. The air-guiding device 8 here comprises at least one air-conditioning layer 25 in connection with the ventilation device 8 and arranged underneath the surface of the seat surface 5' and/or underneath the surface 5" of the backrest.

The air-conditioning layer 25 is predominantly a flat structure that wraps from the bottom side of the seat cushion 4 around the rear edge of the seat cushion 4 and lies flat on the top side 5' of the seat cushion 4. The air-conditioning layer 25 preferably covers essentially the entire surface 5' of the seat cushion 4 facing a user.

The air-guiding device 8 has an air-guiding layer 29, which is preferably formed from a porous, flexible spacing medium 31. Here, for example, spacing fabrics made from synthetic fibers or spiral mats can be used. The air-guiding layer 29 preferably forms at least one part of the air-conditioning layer 25. The air-guiding layer 29 is preferably covered as in the present case by a jacket layer 33, 33' on both sides. Preferably, the jacket layers 33, 33' also seal the air-guiding layer 29 airtight from the surroundings 35 at the edges. The jacket layers are produced, for example, from polyurethane fabrics or similar materials, and adhered or sealed preferably airtight at their edges with each other or with the cushion 4, 4' of the seat 3 (or another interior component).

The air-guiding device 8 is preferably constructed so that the air-guiding layer 29 and the jacket layers 33, 33' form a contiguous assembly for guiding air.

In the present case, therefore, an elongated pocket is produced at whose one pocket end 40 there is an opening 42 at which a fan can be arranged (not shown). At its other end assigned to the air-conditioned surface 5 are perforations 45 through which air can be exchanged with the surroundings of a passenger (by blowing air out or drawing air in through the air-guiding device 8).

A surface 5, 5', 5" of the seat 3 to be air conditioned forms an area 43 to be air conditioned and is provided with a covering 49 that is at least partially air permeable. One end of the air-guiding device 8 is assigned to this area 43. The air-guiding device 8 has perforations 45 in the jacket layer 33' in this area 43.

On the opposite end of the air-guiding device 8, which is preferably arranged as in the present use on the bottom side of the seat cushion 4, there is a connection area 37. Here the jacket layer 33 preferably has at least one opening 42.

On the bottom side of the seat cushion 4 there is preferably a module for air conditioning, which is not shown in the drawings for the sake of better illustration of the other components, at the connection area 37. The module for air conditioning can have a ventilation device in the form of a fan, a heating device, preferably a PTC heating element, a heat exchanger, a regulator unit for regulating the operation of the fan and/or the heating device, and/or a temperature sensor in order to measure the temperature, e.g., of the suctioned air.

The air-guiding device 8 can have, e.g., an axial or radial fan, or can also be formed by this itself in a simplified embodiment. It can be arranged under the seat surface, behind the backrest, next to the seat, or at another, also remote position. The ventilation device can alternatively also be connected to an air-conditioning system of a motor vehicle or can be formed by this system.

A companion layer 27 is provided on the air-conditioning device 1 in its area that is assigned to the surface 5 to be air conditioned.

In the embodiment, a heating element 11 is arranged such that it forms a companion layer 27 arranged approximately parallel to the air-conditioning layer 25, and creates a pocket-like intermediate space in the shape of an insertion pocket 28 between the two layers.

The pocket edges 14 of the insertion pocket 28 are formed by adhering or stitching the edges of the heating element to the border of the air-conditioning layer. At least one, but at most two edges of the companion layer 27 are fixed to the air-conditioning layer. An insertion pocket 28 is therefore produced into which a detector device 9 can be pushed. This insertion process can take place before the installation of the air-conditioning device in the seat or after its installation in the seat. Through-holes 15 in the heating elements are used for visually checking the correct position of the detector device relative to the air-conditioning device or relative to the seat. The detector device is adhered onto the air-conditioning layer or the seat as the last step, so that the position relative to the seat can still be corrected at the end.

The detector device 9 is preferably constructed in the form of a flat detector layer 23. This can be formed, for example, by a film with a plurality of pressure sensors arranged on the film. In the present case, two or more electrically conductive layers (not shown) of approximately the size of the detector layer 23 are laid one above the other in order to form a pressure-sensitive capacitor.

The detector layer has through holes 10 in order to allow the passage of air through the detector layer 23. These are preferably arranged essentially congruent with the holes 45 of the air-conditioning layer 25.

The detector layer 23 is inserted into the insertion pocket 28 of the air-conditioning device 1. Before installation, e.g., in a seat, it can be easily adjusted before the covering 49 of the seat 3 is applied.

It is advantageous that the detector layer 23 can slip less within the insertion pocket 28 than when simply placing the components one on top of the other.

It is advantageous if a heating element is also arranged closer than the air-guiding layer 29 to the passenger, in order to transfer its heat effect more quickly and more effectively to a surface 5 contacted by the user. The heating element 11 or its heat output can therefore have smaller dimensions.

In heating mode, air is drawn from the bottom side of the seat into the module for air conditioning and is then temperature controlled and/or dehumidified. Then it flows into the air-guiding device 8 via the connection area 37.

It flows into the air-guiding device 8 and is deflected by the jacket layers 33 through the air-guiding layer 29 to the top side of the seat cushion 4. There, it flows in the area 43 through holes 45 out of the air-guiding device 8, penetrates the seat covering 49, and conditions the surface 5 to be air-conditioned.

The invention is not limited to the preceding embodiments. Instead, a plurality of variants and modifications are conceivable which make use of ideas according to the invention and therefore also fall within the scope of protection.

For example, it may be preferable for the air-conditioning device and/or the detector device to be installed in a vehicle seat, a steering wheel, an armrest, a sitting surface, a heating blanket, lounge furniture, theater seats, floors, door linings, or the like. They can be located in a sitting surface or, as here, between the sitting surface and the seat cushion. It may be preferable for the heating element to be installed in a larger sub-system, in order to provide the seat user with heating, cooling, ventilation, etc.

Provision can be made for the heating element and the air-conditioning layer to be connected to each other only at one of their edges and for them to use at least partially the same carrier, so that stitching is not required for forming a pocket, but instead only folding.

The insertion pocket 28 can also have anchoring devices 50 for fixed anchoring of the detector device 9 at a fixed position, e.g., snap-in locks or Velcro strips.

It is advantageous for the air-conditioning layer to have an air-guiding layer, as here, in the form of an intermediate layer which has an air-permeable cushioning material. Thus, hard parts or recesses in a detector device can be evened out. This increases the sitting comfort and also provides heat insulation against a heating element. The air-guiding layer is preferably formed at least partially from reticulated foam, air-permeable textile, non-woven material, or the like.

The air-conditioning layer 25 preferably comprises both the air-guiding layer 29 and also the heating element 11. However, it can also comprise only one of the two, e.g., for certain climate zones.

The heating element or the air-guiding layer can also be used as the companion layer 27 as an alternative to the companion layer made from separate textile material.

Reference symbols
1 Air-conditioning device
3 Seat
4 Seat cushion
4' Backrest cushion
5 Surface contacted by the user and to be conditioned
5' Surface of the seat
5" Surface of the backrest
7 Air passage opening
8 Air-guiding device
9 Detector device
10 Through holes for air passage through detector device
11 Heating element
12 Carrier layer
13 Heating conductor
14 Pocket edges
15 Through holes
23 Detector layer
25 Air-conditioning layer
27 Companion layer
28 Insertion pocket
29 Air-guiding layer
31 Spacing medium
33, 33' Jacket layers
35 Surroundings
37 Connection area
40 Pocket end
42 Opening of pocket
43 Area to be conditioned
45 Holes (in jacket layer)
49 Covering

What is claimed is:

1. An air-conditioning device for a vehicle interior component comprising:
    at least one air-conditioning layer;
    at least one companion layer including one or two edges affixed to at least one edge of the at least one air-conditioning layer and forming an insertion pocket between the at least one companion layer and the at least one air-conditioning layer, the insertion pocket defining an insertion opening;
    at least one detector device inserted into the insertion pocket through the insertion opening;
    wherein the at least one companion layer is proximate to a user contact surface of he vehicle interior component,
    wherein the at least one detector device includes at least one or more holes in fluid communication with at least one or more holes provided within the at least one air-conditioning layer.

2. The air-conditioning device according to claim 1, wherein the at least one companion layer further comprises a heating element.

3. The air-conditioning device according to claim 2, wherein the at least one companion layer includes one or more through holes through which the at least one detector device is visible when inserted into the insertion pocket.

4. The air-conditioning device according to claim 1, wherein the one or more through holes in the at least one detector device and in the at least one air-conditioning layer are congruent.

5. The air-conditioning device according to claim 1, wherein the insertion pocket further includes one or more anchoring devices adapted to anchor the at least one detector device.

6. The air-conditioning device according to claim 1, wherein the at least one air-conditioning layer comprises an air-guiding layer, wherein said air-guiding layer is formed of a flexible spacing medium and covered by two or more jacket layers.

7. The air-conditioning device according to claim 1, wherein the at least one air-conditioning layer further includes a heating element.

8. The air-conditioning device according to claim 1, wherein the at least one companion layer includes at most two edges affixed to the at least one air-conditioning layer.

* * * * *